United States Patent
Ward

[19]

[11] Patent Number: 6,113,285
[45] Date of Patent: Sep. 5, 2000

[54] ILLUMINATOR HEAT DISSIPATION SYSTEM

[75] Inventor: Patrick H. Ward, San Antonio, Tex.

[73] Assignee: Lucifer Lighting Co., San Antonio, Tex.

[21] Appl. No.: 09/084,653

[22] Filed: May 26, 1998

[51] Int. Cl.[7] .............................. G02B 6/36; G02B 6/26
[52] U.S. Cl. .................. 385/93; 385/38; 385/81
[58] Field of Search .................. 385/15, 31–35, 385/39, 53, 60–63, 72–74, 78–81, 88, 92–94, 138, 901; 359/819–821, 825–830

[56] References Cited

U.S. PATENT DOCUMENTS

| | | | |
|---|---|---|---|
| 4,657,014 | 4/1987 | Edelman et al. | 385/93 |
| 5,283,802 | 2/1994 | Hsiung | 385/93 |
| 5,761,356 | 6/1998 | Li | 385/38 |
| 5,841,923 | 11/1998 | Kyoya | 385/93 |
| 5,943,462 | 8/1999 | Schofield et al. | 385/81 |

*Primary Examiner*—Thong Nguyen
*Attorney, Agent, or Firm*—Jenkens & Gilchrist

[57] ABSTRACT

A cold coupling apparatus for receiving light from a source of illumination and transmission to the ends of one or more light-guiding fibers comprises a coupler body having an exit bore, an inner bore, an entry bore, and body threads, the exit bore and inner bore intersecting to form a lens shelf, and the entry bore and inner bore intersecting to form a fiber shelf; one or more lenses disposed within the exit bore and proximate to the lens shelf; a compression fitting threadedly engaged with the body threads; a collet disposed within the compression fitting; and one or more ferrules, each of the ferrules disposed within the entry bore and proximate to the fiber shelf. A bushing may also be disposed within the compression fitting, and the lenses may be coated to reflect infrared and/or ultraviolet radiation. The coupler body may be actively cooled, or may have heat sink fins attached to its exterior.

21 Claims, 3 Drawing Sheets

ILLUMINATOR HEAT DISSIPATION SYSTEM

BACKGROUND OF THE INVENTION

1. Technical Field

This invention relates generally to the field of fiber optic illuminators, and more particularly to an apparatus for coupling light from the source of illumination to individual fibers, while minimizing the heat transmitted thereto.

2. History of Related Art

Fiber optic illuminators generally provide a source of intense light at the end of an optical fiber, or optical fiber bundles. Glass fibers are heat resistant and readily available, however, they are usually quite expensive in comparison to plastic fibers, which have a soft core construction, in which the flexible core is sheathed in a thin-walled tube of heat-resistant plastic. The light-transmitting core (either solid or stranded) of such plastic fibers can be operated at temperatures as high as 140° C., but after long-term use, cross-linking is affected, and the core ages, discolors, and becomes brittle. In fact, this is so well known in the industry that some manufacturers recommend building "service loops" into plastic fiber installations so that the aged plastic can be cut away after time and replaced with fresh fiber that has not been placed in close proximity to the source of illumination.

Heat degradation is not the only problem encountered when using plastic fibers. There is also the difficulty of infrared and ultraviolet radiation. Commonly available halogen and metal halide lamps used to illuminate the ends of fibers produce a substantial amount of infrared and ultraviolet energy. The infrared energy is mostly dissipated after a few inches of travel down the fiber, however, the ultraviolet energy travels with the light and goes along the length of the fiber, damaging the entire length of the fiber by affecting the cross-linking ability of the polymers used to make it.

Various approaches have been attempted to provide sufficient light to the fiber ends, while preventing the fibers from overheating. Such thermal control techniques include the use of dichroic reflector lamps, defocusing the lamp image, cooling fans, infrared-reflecting dichroic mirrors, and optically-tuned heat absorbers.

In one method a fan-assisted heat dissipator, comprising a fan and motor, are mounted behind a light and draw external air through passages within a heat sink, which in turn surrounds an optical fiber. A glass rod is interposed between the end of the fiber and the light so as to prevent direct reception of the focused beam at the fiber end surface. In operation, the fan serves to draw external air through the heat sink, so as to cool the glass rod and the light. The cooling air passes onward, and is exhausted. To reduce the amount of such cooling required, the glass rod serves as a relatively non-heat conductive medium for the transmission of light. However, a significant amount of optical attenuation occurs with this particular implementation, wherein several dissimilar interfaces have been interposed between the light, and the end of the fiber. Such dissimilar material interfaces are problematic because the optical output angle of the glass rod differs from the optical acceptance angle of the plastic fiber, which impedes light transmission.

When multiple fibers are illuminated, another approach has typically been employed. In this case, air is typically drawn through the interstices of several unitary fibers, or stranded fibers, of a fiber bundle heat dissipator. A heat sink body, having fins, serves to radiate some of the heat in the fibers, which are clamped together within a collar, surrounded by a strap. A tightening screw is used to help maintain alignment of the fiber bundle within the heat sink body, but over-tightening often results in deformation of the individual fibers. This particular method may be used in conjunction with a glass rod, as described above. However, such a system results in an undesirable reduction of the light received by each of the fibers within the heat sink body.

Therefore, what is needed is a heat dissipation apparatus, or "cold coupling" apparatus which effectively filters out infrared and ultraviolet radiation, while employing the least number of optical interfaces along the path from the source of illumination to the end of the fibers. It is further desired to provide such an apparatus that does not deform bundles of fibers due to excessive clamping force, is readily manufactured, and makes use of inexpensive parts. Further, it is desirable to provide such an apparatus which maintains the temperature of plastic fibers at 140° C., without the use of a fan, in conjunction with commonly available illumination sources.

SUMMARY OF THE INVENTION

The present invention is embodied by a cold coupling apparatus for receiving light from a source of illumination and transmission to the ends of one or more light-guiding fibers, such as solid core, stranded core, or liquid core fibers, comprising a coupler body having body threads formed thereon, an exit bore, an inner bore, and an entry bore, wherein the exit bore and inner bore intersect to form a lens shelf, and the entry bore and inner bore intersect to form a fiber shelf; a lens disposed within the exit bore and proximate to the lens shelf; a compression fitting threadedly engaged with the body threads; a collet disposed within the compression fitting; and one or more ferrules, each of the ferrules disposed within the entry bore and proximate to the fiber shelf. The cold coupling apparatus of the present invention may further comprise a bushing disposed within the compression fitting, a lens coated to reflect infrared radiation and/or ultraviolet radiation, and heat sink fins attached to the exterior of the coupler body.

The cold coupling apparatus of the present invention may also comprise a lens ring disposed within the exit bore, wherein the lens is retained between the lens ring and the lens shelf. The exit bore may include a ring groove, and the lens ring may be retained within the exit bore using the ring groove. The ferrules may provide a thermally conductive path from the fibers to the coupler body.

A plurality of lenses may be disposed within the exit bore. Further, the coupler body of the cold coupling apparatus of the present invention may be actively cooled.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
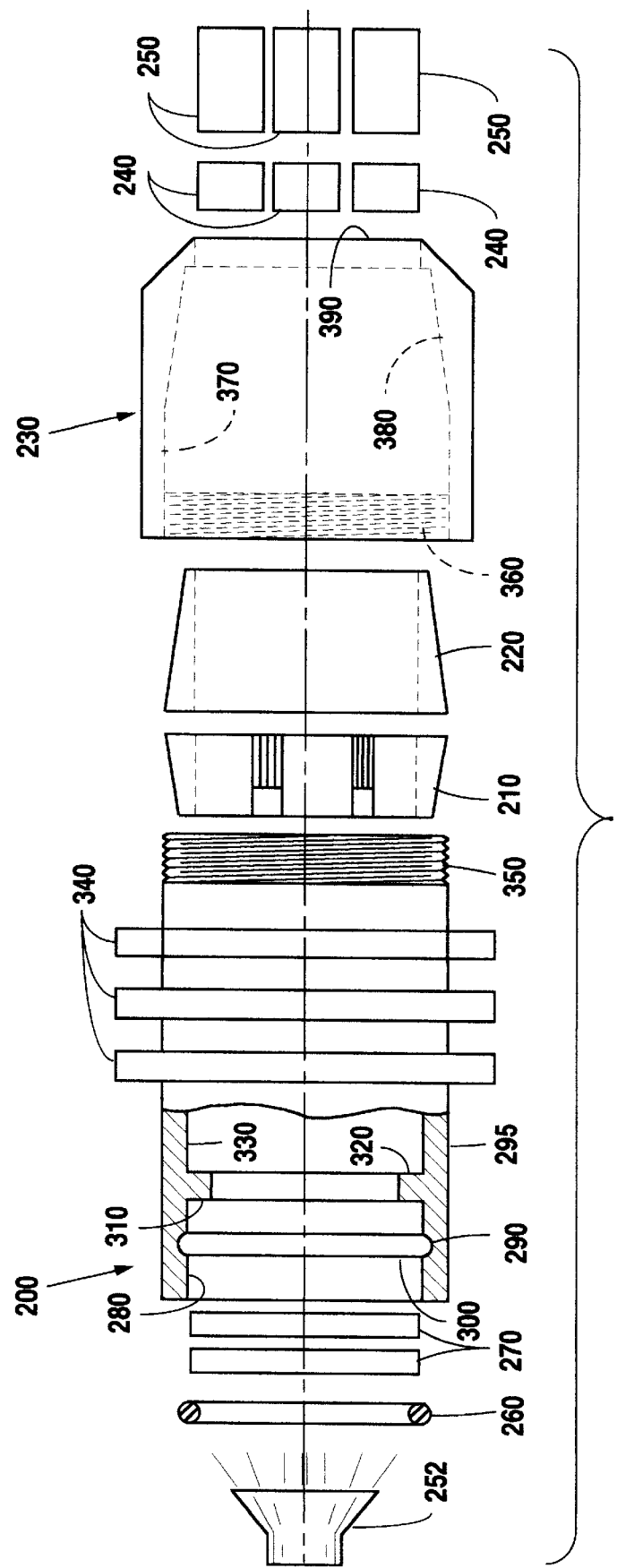
FIG. 1 is a side, cut-away, exploded view of a preferred embodiment of the present invention.
Figure 2:
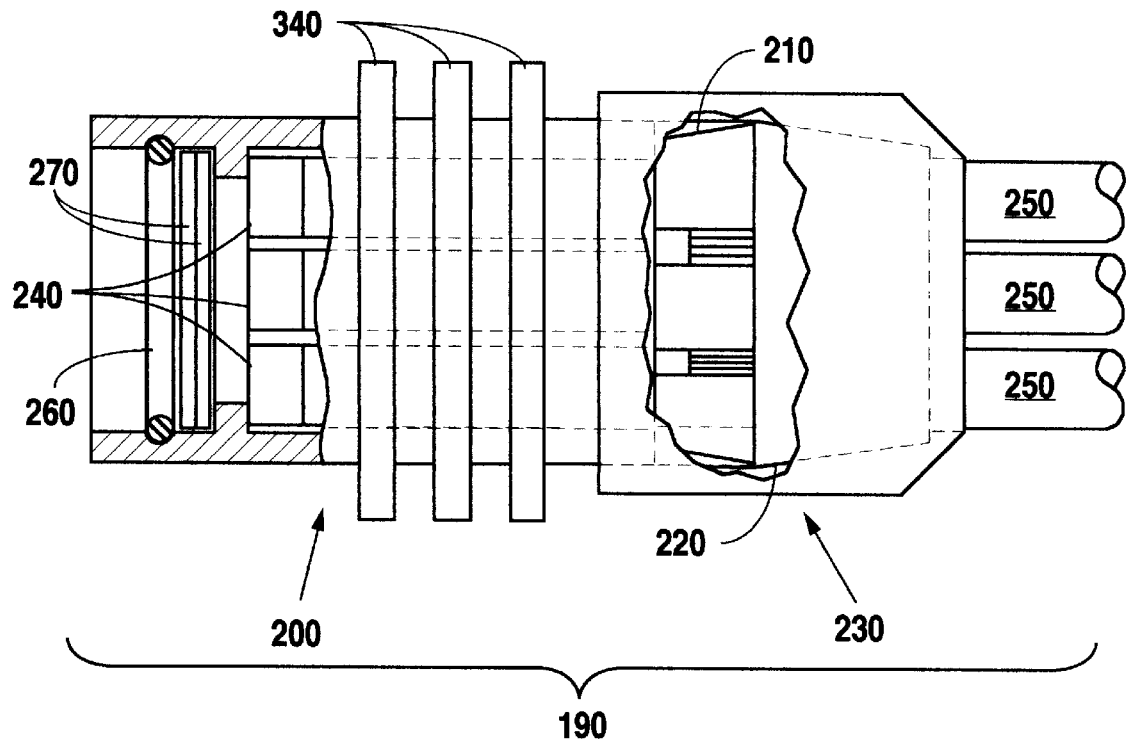
FIG. 2 is a side, cut-away, assembled view of a preferred embodiment of the present invention.

Turning now to FIGS. 1 and 2, exploded and assembled views, respectively, of one embodiment of the cold coupling apparatus 190 of the present invention can be seen. The apparatus 190, when used in conjunction with an optical fiber 250, may have six major components: a lens 270, a coupler body 200, a collet 210, a bushing 220, a compression fitting 230, and one or more ferrules 240.

The coupler body 200 is typically formed as a tubular structure having an entry bore 280 which intersects with an inner bore 300 having a lesser diameter than the entry bore 280, to form a lens shelf 310. The before present invention contemplates the accommodation of one or more lenses 270 within the entry bore 280. However, in the preferred embodiment, a single lens is used to reduce the number of optical interfaces encountered by light as it travels from the source of illumination to the optical fiber ends. The lens 270 may be similar to, or identical to, Optivex part no. DF-410. The lens 270 is preferably coated to prevent passage of ultraviolet and infrared radiation. As mentioned previously, if desired, more than one lens 270 may be used, and, if applicable, each lens 270 coated with a different filtration material. In the alternative, and more preferably, a single lens with multiple coatings should be used. The lens is loosely retained against the lens shelf by disposition between the lens shelf and a lens ring 260, which may be retained in the entry bore 280 by way of groove 290.

The coupler body 200 also comprises an exit bore 330, which is of a larger diameter than the inner bore 300. The exit bore 330 and the inner bore 300 intersect to form a fiber shelf 320. The coupler body 200 also comprises heat sink fins 340 for radiative heat transfer, and body threads 350 for threaded engagement with the fitting threads 360 of the compression fitting 230. The heat sink fins 340 are attached to the exterior 295 of the coupler body. Depending on the amount of heat to be dissipated, the fins 340 may not be necessary; it is also possible for the coupler body 200 to be actively cooled by Peltier devices, or by other methods, such as by immersion in an air stream, liquid bath, or refrigerant.

The compression fitting 230 also comprises a fitting entry 390, formed for the entry of one or more fibers 250, along with a fitting bore 370 and fitting neck 380 for the receipt and compression of the collet 210 and bushing 220.

The cold coupling apparatus 190 of the present invention, shown in assembled form in FIG. 2, has been found by way of experimentation to maintain the fiber 250 temperature at 120° C. or less (measured at an ambient temperature of 25° C.), when used in conjunction with a metal halide illuminator 252 such that the ends of the fibers are within 7.5 cm of the source of illumination 252.

The cold coupling apparatus 190 of the present invention functions in an optimal fashion when certain elements of the apparatus are fabricated from specific materials, more particularly, the coupler body 200 is most preferably fabricated from a heat-conductive material, such as aluminum, which has been black anodized to act as a black-body radiator. The lens 270, which is coated so as to block infrared and ultraviolet radiation, is generally loosely mounted against the lens shelf 310, and retained within the entry bore 280 by a steel lens ring 260. This system of loose mounting will accommodate varied rates of expansion between the materials used to fabricate the coupler body 200, the lens 270 and the lens ring 260.

It has also been determined by experiment that, if two different lens coatings must be used, it is preferable to place the infrared coating of the lens 270 closer to the source of illumination 252 than the ultraviolet coating, so as to minimize the amount of heat entering the coupler body 200 by way of the lens 270. The remaining heat within the exit bore 330 is conducted from the ferrules 240 on the ends of the fibers 250 to the coupler body 200.

The materials used to fabricate the collet 210 and bushing 220 are also important. The collet 210 is most preferably fabricated from a soft material which, when compressed around the fiber 250 cladding, will not distort the shape of the fiber 250. The material used to fabricate the collet 210 should also be resilient and deformable, so as to easily accommodate the compression forces imposed by the compression fitting 230, which are opposed by the outer surfaces of the fibers 250. The bushing 220 is most preferably made from rubber or a deformable polymer which provides for frictional engagement between the bushing and the fibers 250. Compliant deformation is important to the function of the bushing 220 so as to provide the maximum amount of surface contact between the bushing 220 and the fibers 250 retained therein. Further, a material having a high coefficient of friction with respect to the outer cladding of the fibers 250 is also desirable.

Figure 3:
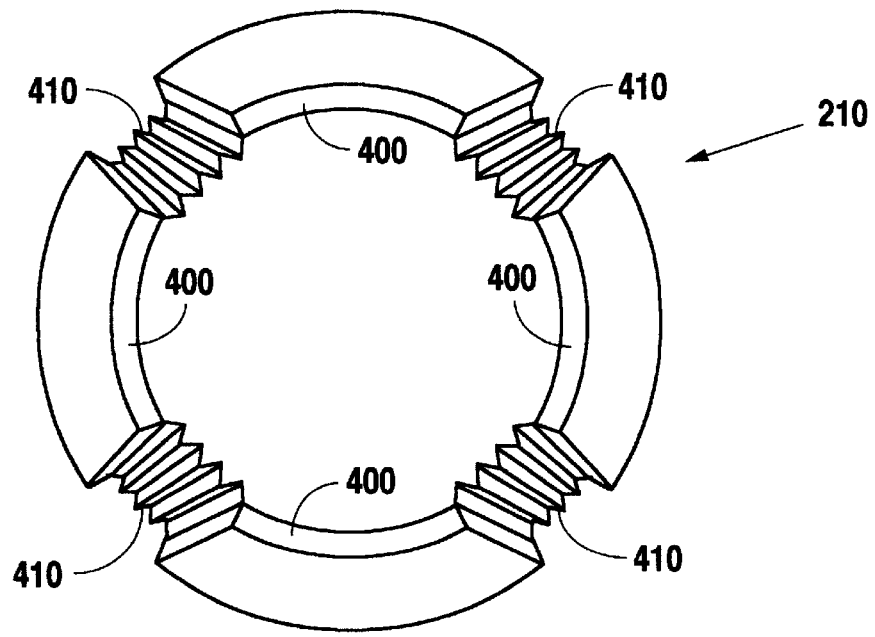
FIG. 3 is a perspective view of a collet which may be used in the present invention.

Turning now to FIG. 3, a perspective end-view of the collet can be seen. While any number of collet designs and clamping mechanisms may lend themselves to use with the present invention, it has been found by experimentation that forming the collet 210 from a set of fingers 400, interconnected by hinges 410, provides the optimal design for non-distorting compression of a fiber bundle within the coupler body 200. The collet 210 shown is most preferably used for retention of up to four fibers. However, more or less than this number can be used, the invention being adaptable to various numbers and sizes of fibers. "Dummy" place holders formed from an aluminum rod or tube may be used to fully occupy the open space within the collet 210 left by irregular numbers and sizes of fibers, and provide an optimal degree of evenly distributed pressure around the circumference of the fiber bundle. The collet 210 itself may also be formed of a heat-conducting material for better cooling of the fibers contained therein. When only a single fiber is used, the collet 210 may not be necessary; sufficient retention of the fiber within the coupler body 200 may be achieved by using only the bushing 220 in conjunction with the compression fitting 230.

Figure 4:
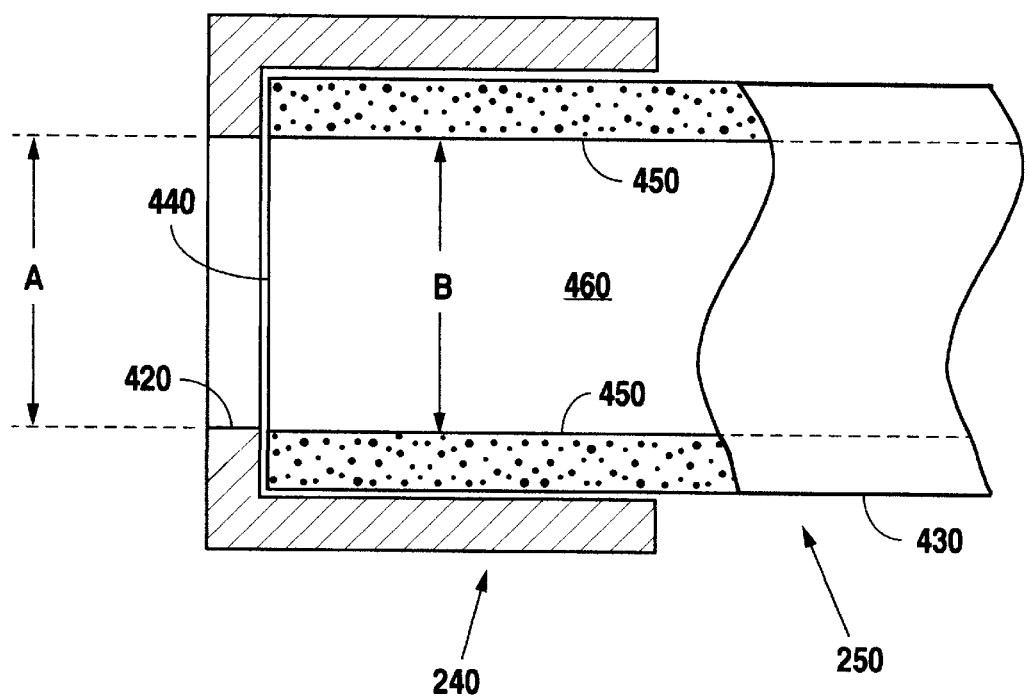
FIG. 4 is a side, cut-away, view of a ferrule which may be used in the present invention.

FIG. 4 illustrates a side cut-away view of the ferrule 240 used in the present invention, which serve several functions. First, each ferrule 240 which is placed over an individual fiber end 440, serves to maintain the circular shape of the fiber, promoting maximum illumination throughout the fiber transmission medium. Second, each ferrule 240 protects the corresponding fiber 250 from heat degradation. Without the use of such ferrules 240, heat from the illumination source causes the fiber jacket 430 to break down and form a gas which oxidizes over the fiber end 440, impairing light transmission. Employing ferrules 240 overcomes the problem of such oxidation, without removing the fiber jacket, avoiding damage to the protective cladding 450 and core 460 material. Third, the ferrules 240 provide a thermally conductive path from the fiber 250 to the coupler body 200. For large fiber bundles, wherein fibers exist that are not in direct contact with the collet 210, the ferrules also conduct heat from the ends of these inner fibers, through other ferrules, to the coupler body 200.

To achieve maximum light transmission with minimal heat transfer, the ends of the ferrules 240 should be placed from about 1.2 mm to about 5.0 mm away from the proximate surface of the lens 270. Most preferably, the ends of the ferrules are placed from about 2.5 mm to about 3.1 mm away from the proximate surface of the lens 270. This distance can be varied; placing the ferrules closer to the lens increases the heat received by the fibers, and also increases the amount of light received. Placing the ferrules further away decreases the amount of light received, and also decreases fiber heating.

Figure 5:
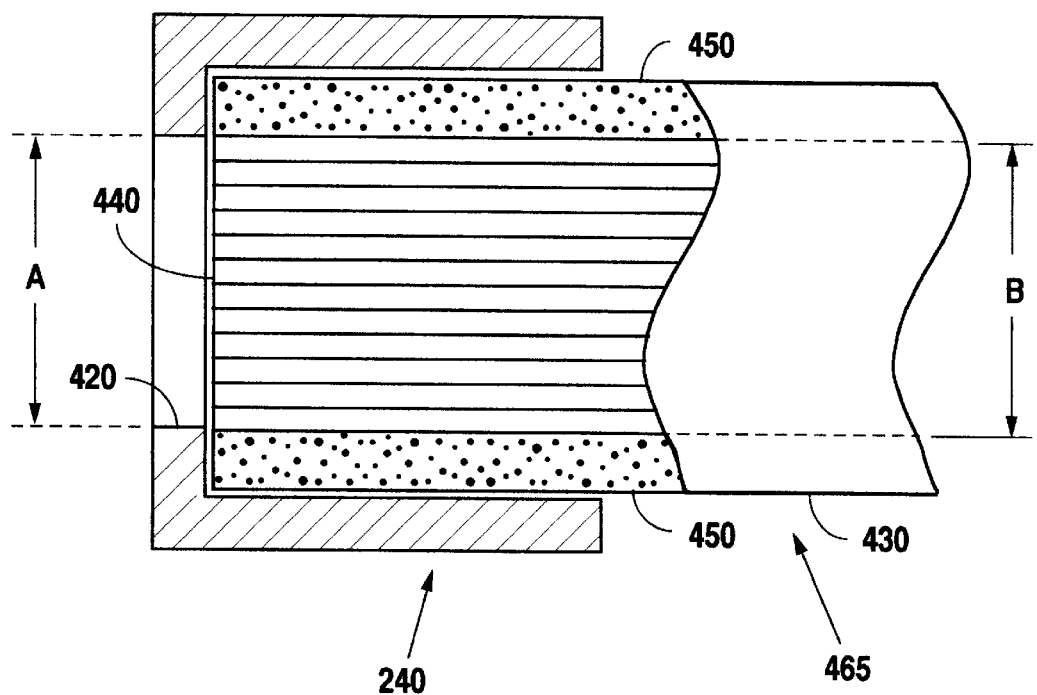
FIG. 5 is a side, cut-away, view of a ferrule and stranded core fibre which may be used in the present invention.

The ferrules 240, which rest against the fiber shelf 320 when the cold coupling apparatus 190 is fully assembled, are generally fabricated so that the ferrule exit bore 420, shown by distance "A", is approximately the same diameter as the fiber optical core 460, shown by distance "B". Sizing the ferrule exit bore 420 to be about the same diameter as the fiber optical core 460 allows for maximum light transmission, while still providing adequate protection and secure retention of the fiber end 440. While FIG. 4 illustrates a solid core fiber, stranded, or liquid core fibers may also be used. As shown in FIG. 5, stranded core fiber 465 may also be used in conjunction with the ferrule 240 of the present invention.

The present invention provides several advantages over the prior art discussed above. First, there is no air movement around the ends of the fiber in the present invention. Air movement typically brings dust, which degrades light transmission and requires periodic cleaning. Second, the compression fitting 230, combined with the collet 210 and bushing 220, maintains sufficient frictional engagement with the fibers 250 so as to retain them within the coupler body 200, without deforming the fibers 250 and reducing the transmission of light therein.

Third, the lens 270 provides the only interruption of the optical path between the source of illumination 252 and the fibers 250. No intermediate, dissimilar materials, such as glass coupling rods, are necessary. This increases the amount of light which can be transmitted to the ends of the fibers 250, while providing a mechanism for blocking infrared and ultraviolet radiation, and dust. In addition, the lens 270 provides an air barrier, which further insulates the ends of the fibers 250 from any heat that passes through the lens 270.

Fourth, the present invention also aids in simplifying field installation in that adhesives, splice connectors, and their associated attenuation, are not required due to the fact that field cut lengths of optical fiber can be installed directly in the cold coupling apparatus.

Although the present invention is described in terms of a preferred exemplary embodiment, other uses of the invention, such as transmitting light from an intense source of illumination to any other type of receiving mechanism which is heat-sensitive, are contemplated. Such uses are intended to fall within the scope of the following claims. Other aspects, features, and advantages of the present invention may be obtained from a study of this disclosure and the drawings, along with the appended claims.

What I claim is:

1. A cold coupling apparatus for receiving light from a source and transmitting the received light to an end of at least one light-guiding fiber, comprising:
   a coupler body having body engagement means formed thereon, an entry bore, an inner bore, and an exit bore, wherein the entry bore and the inner bore intersect to form a lens shelf, and the exit bore and the inner bore intersect to form a fiber shelf;
   a lens disposed within the entry bore and proximate to the lens shelf;
   a compression fitting engaged with the body engagement means;
   a collet disposed within the compression fitting; and
   at least one ferrule disposed within the exit bore.

2. The cold coupling apparatus of claim 1, further comprising a bushing disposed within the compression fitting.

3. The cold coupling apparatus of claim 2, wherein the lens is coated to reflect infrared radiation.

4. The cold coupling apparatus of claim 2, wherein the lens is coated to reflect ultraviolet radiation.

5. The cold coupling apparatus of claim 2, wherein the coupler body further comprises an exterior and heat sink fins are attached to the exterior of the coupler body.

6. The cold coupling apparatus of claim 2, further comprising a lens ring, wherein the lens is retained between the lens ring and the lens shelf.

7. The cold coupling apparatus of claim 6, wherein the entry bore includes a ring groove, and the lens ring is retained within the entry bore with said ring groove.

8. The cold coupling apparatus of claim 2, wherein a plurality of lenses are disposed within the entry bore.

9. The cold coupling apparatus of claim 2, wherein the coupler body is actively cooled.

10. The cold coupling apparatus of claim 1, wherein the lens is coated to reflect infrared radiation.

11. The cold coupling apparatus of claim 1, wherein the lens is coated to reflect ultraviolet radiation.

12. The cold coupling apparatus of claim 1, wherein the coupler body further comprises an exterior and heat sink fins are attached to the exterior of the coupler body.

13. The cold coupling apparatus of claim 1, further comprising a lens ring disposed within the entry bore, wherein the lens is retained between the lens ring and the lens shelf.

14. The cold coupling apparatus of claim 13, wherein the entry bore includes a ring groove, and the lens ring is retained within the entry bore with said ring groove.

15. The cold coupling apparatus of claim 1, wherein a plurality of lenses are disposed within the entry bore.

16. The cold coupling apparatus of claim 1, wherein the coupler body is actively cooled.

17. The cold coupling apparatus of claim 1, provides a thermally conductive path from the said at least one light-guiding fiber to the coupler body.

18. The cold coupling apparatus of claim 1, further comprising at least one ferrule, said at least one ferrule being disposed within the exit bore and proximate to the fiber shelf.

19. The cold coupling apparatus of claim 18, wherein said at least one ferrule is placed from about 1.2 mm to about 5.0 mm away from the lens.

20. The cold coupling apparatus of claim 18, wherein said at least one ferrule is placed from about 2.5 mm to about 3.1 mm away from the lens.

21. The cold coupling apparatus of claim 18, wherein said at least one ferrule provides a thermally conductive path from said at least one light-guiding fiber to the coupler body.

* * * * *